United States Patent [19]

Farrar et al.

[11] Patent Number: 4,554,307

[45] Date of Patent: * Nov. 19, 1985

[54] WATER SOLUBLE POLYMERS AND DISPERSIONS CONTAINING THEM

[75] Inventors: David Farrar; Malcolm Hawe, both of West Yorkshire, England

[73] Assignee: Allied Colloids Limited, England

[ * ] Notice: The portion of the term of this patent subsequent to Mar. 26, 2002 has been disclaimed.

[21] Appl. No.: 672,308

[22] Filed: Nov. 16, 1984

Related U.S. Application Data

[63] Continuation-in-part of Ser. No. 612,516, May 21, 1984, Pat. No. 4,507,422.

[30] Foreign Application Priority Data

May 20, 1983 [GB] United Kingdom ................. 8313976
Aug. 12, 1983 [GB] United Kingdom ................. 8321731

[51] Int. Cl.$^4$ .......................... C09D 3/74; C09D 3/80
[52] U.S. Cl. ..................................... 524/425; 524/445; 524/446; 524/447; 524/497; 524/555; 524/556

[58] Field of Search ............... 524/425, 445, 446, 447, 524/497, 555, 556

[56] References Cited

U.S. PATENT DOCUMENTS 3,759,860 9/1973 Peaker ................................. 528/391
3,840,487 10/1974 Dyson et al. ........................ 524/394

FOREIGN PATENT DOCUMENTS

EP46573 3/1982 European Pat. Off. .
EP68887 1/1983 European Pat. Off. .
EP108842 5/1984 European Pat. Off. .

*Primary Examiner*—Ronald W. Griffin
*Attorney, Agent, or Firm*—Lawrence Rosen

[57] ABSTRACT

Pigment dispersions contain, as dispersing agent novel water soluble polymers containing acid groups, preferably polyacrylic acid or copolymers of polyacrylic acid with AMPS, having polydispersity below 1.5 and molecular weight in the range about 1,000 to about 5,000.

12 Claims, No Drawings

WATER SOLUBLE POLYMERS AND DISPERSIONS CONTAINING THEM

This application is a continuation-in-part of our application Ser. No. 612,516 filed May 21, 1984, now U.S. Pat. No. 4,507,422.

It is well known that low molecular weight water soluble polymers, and especially such polymers containing acidic groups that may have been partially or completely neutralised, are of value as pigment dispersants (including grinding aids). The polymers generally have a molecular weight (weight average molecular weight, Mw) of 1,000 to 10,000. However, the polymer will always consist of a blend of molecules of differing molecular weights, according to the number of monomeric units in each molecule. In practice, each commercial polymer is a mixture of molecules having a very wide variation in chain length. For instance a polymer having $Mw = 5,000$ will generally contain significant amounts of molecules of molecular weight below 1,000 and above 6,000. The extent to which any particular product is formed of molecules of a range of chain lengths is measured by its polydispersity. The polydispersity (PD) of a product is the weight average molecular weight (Mw) divided by the number average molecular weight (Mn). If $PD = 1$ then the polymer consists entirely of molecules of a single chain length. In practice PD is always much higher, generally above 2.

British Specification No. 1414964 describes certain vinyl acetate copolymers for dispersing chalk. In example 2, the polymers are described as having a number average molecular weight of 1,200 to 2,300 and fractional precipitation of the polymer is said to give fractions having number average molecular weight of 150 to 4,000. Slightly different process conditions in Example 3 are said to give a narrower molecular weight distribution and fractions of from 960 to 3,000. The range of molecular weight within each fraction is not quoted. The specification does not disclose the use or properties of any of these fractions but it does attempt to show that the polymer of Example 3 (that is a blend of fractions having average molecular weights of 960 to 3,000) has better properties than the product of Example 2 and attributes this to the "effect of optimising the molecular weight distribution". Since the polymers of Examples 2 and 3 could be split into polymer fractions having such a wide range of molecular weights, it is clear that the polymers of Examples 2 and 3 both had high polydispersity values, probably of the order of 2. It is impossible to predict what the polydispersity values would have been of the polymer fractions, as this can vary according to the method of fractionisation, but it was probably in excess of 1.7. There is no suggestion to use the polymer fractions for any purpose.

The products that commercially are most successful as dispersants are polyacrylic acid and acrylic acid—2-acrylamido 2-methyl propane sulphonic acid (AMPS) copolymers. A widely used polyacrylic acid (as the sodium salt) is our product Dispex N40 (Dispex is a trade mark). The products we sell generally have polydispersity values above 1.8 and indeed most products that are commercially available have polydispersity values above 2. We have regarded it an uneconomic and unnecessary to strive for lower polydispersity values and although batches of polymer having polydispersity slightly below 1.8 are sometimes made by us, during storage they always become blended with batches having higher polydispersity.

It is standard practice to make water soluble acidic polymers, such as polyacrylic acid, by solution polymerisation in which event the solvent may be a blend of water and an organic liquid such as isopropanol. The product of the polymerisation is a solution of polymer together with some oligomer and unreacted monomer.

One process that we have used for removing the unwanted low molecular weight components, i.e. the oligomers and monomer, has involved adding excess sodium hydroxide to the solution so as to neutralise all the acidic groups, and allowing the mixture to separate into an upper isopropanol fraction containing the unwanted low molecular weight components and a lower aqueous fraction containing the desired polymer. This fractionation has been regarded merely as a way of separating the useful polymer from the unwanted by-products. The useful polymer is a blend of molecules of various molecular weights and the PD values quoted above are of the purified polymer.

A particular process for separating unwanted by-products is described in European Patent Publication No. 46573. In this it is said that an aqueous solution of polyacrylic acid may be neutralised and that the neutralised polymerisate may then be treated in the usual way with polar solvents, methanol, ethanol, propanol, isopropanol, acetone and tetrahydrofuran being mentioned. In the examples 80 grams fully neutralised sodium polyacrylate is fractionated in solution in 500 grams water with 400 grams methanol or 40 grams isopropanol. In each instance the lighter, organic, phase is rejected. This therefore seems to be a conventional fractionation to remove oligomers and the product would therefore be a conventional blend of molecular weights. If the starting polymer mixture is conventional the Mw, Mn and PD values of the extracted polymer will also be conventional, e.g. PD above 1.8.

The same patentees have published in their later British Patent Specification No. 2109363 a generally similar disclosure of treating the aqueous polymerisate with polar solvents except that no process details are given and in this example the organic fraction is said to be a useful product having a molecular weight distribution ranging between 400 and 1,200 and the aqueous fraction is said to have a molecular weight ranging between 1,200 and 12,000.

Certain alkyl sulphide, sulphone or sulphoxide terminated oligomers, wherein the alkyl is $C_6$ or higher, are described in U.S. Pat. Nos. 3759860 and 3839405 for use as, for instance, emulsifiers. The large alkyl group appears essential to their functioning as emulsifiers. It probably causes the polymer to tend to come out of solution and to form micelles in the water and contributes hydrophobic properties. These properties are the opposite of what is required in dispersants. There is no suggestion that the polymers should be used for dispersing pigments. It is said that they may have PD less than 2 "and frequently as low as 1.4 to 1.5". Apart from this disclosure, we are unaware of anyone ever having proposed the commercial use of low polydispersity water soluble polymers for any purpose and in particular there has been no suggestion that they would be of use in pigment dispersions. Indeed since it is much easier to make polymers having high PD values than low PD values the possibility of trying to make them on a commercial scale has probably never occurred to anyone previously as no one has ever previously recognised that there is any particular value in them.

Insoluble low molecular weight polymers having low polydispersity values are described in European Patent Specification No. 68887 but since such polymers are insoluble they cannot be used as dispersants.

We have now found that low, or relatively low, molecular weight water soluble polymeric dispersants have greatly improved pigment dispersing properties if the polymer has a much narrower range of molecular weight than has previously been used, that is to say if PD is reduced substantially below the conventional values of 1.8 and above to a value below 1.5. Thus we have found that for any particular purpose optimum results are obtained if the polymer consists of molecules of very limited range of chain lengths. The presence of molecules of other chain lengths is disadvantageous for two reasons. First, and most important, these other molecules counteract the beneficial effects of the preferred molecules, presumably because of preferential absorption or some other deleterious or antagonistic mechanism. Secondly, these other molecules dilute the polymer so that it contains less than the theoretical maximum of the preferred molecules.

The invention provides novel polymers having low polydispersity values and novel compositions utilising such polymers. Many of the compositions are dispersions of particulate material in an aqueous medium. Others are detergent compositions including the defined polymers as detergent builders.

According to the invention a dispersion of pigment or other particulate material in an aqueous medium contains a dispersing agent for the particulate material which is a water soluble polymer formed from one or more ethylenically or other unsaturated monomers and contains acid groups selected from carboxyl, sulphuric and sulphonic groups, or is a water soluble salt thereof, and has a polydispersity of below 1.5 and has a low molecular weight. Mw is normally at least about 1,000, preferably at least 1500, and can be up to about 50,000 although it is generally up to 20,000 and preferably it is up to about 5,000 or about 6000. Particularly preferred products are those having PD below 1.4 and Mw 1,000 to 4,000.

Generally PD=1.05 to 1.45 and in particular from 1.1 to 1.4. The best results are obtained with PD below 1.4 and preferably below 1.35. Although it is desirable for the value to be as close to 1 as possible it is generally acceptable for it to be above 1.25.

The polymers are generally obtained by polymerisation of an ethylenically or allylically unsaturated monomer that contains acid groups either alone or with other unsaturated monomeric material. Oligomers formed from the corresponding monomers may be used in place of the monomers. The acid groups are generally carboxylic acid or sulphuric and sulphonic acid groups. The monomers are often acrylic monomers. Suitable monomers are methacrylic acid, itaconic acid, vinyl sulphonic acid, vinyl sulphuric acid, allyl sulphonic acid, maleic acid, fumaric acid, acrylic acid and 2-acrylamido-2-methyl propane sulphonic acid (AMPS) and 2-acrylamido-2-phenyl sulphonic acid. Any comonomers that can be copolymerised, in the amounts present, with the acidic monomer or monomers to form a water soluble polymer can be used and include monomers such as acrylamide, acrylonitrile and acrylic esters. Generally at least 50% by weight and often at least 80% by weight of the monomers from which the polymer is formed are acidic monomers. The polymer is generally a linear polymer. Particularly preferred polymers are homopolymers of acrylic acid and copolymers of acrylic acid with AMPS.

Throughout this specification it must be understood that any acid polymer can be present in the form of a partial or complete salt with an alkali metal, often sodium, or ammonia or an amine or other cation that yields a water soluble salt. For instance the polymer may be a copolymer of acrylic acid with a salt of AMPS or it may be a complete salt or acrylic acid AMPS copolymer or a partial or complete salt of acrylic acid. All molecular weights herein are measured as the full sodium salt.

The polymers are preferably terminated by hydroxyl, carboxylic or $C_{1-3}$ alkyl groups, for instance as a result of having been polymerised in the presence of isopropanol or thioglycolic acid as chain terminators. The presence of long chain alkyl groups, for instance containing 6 carbon atoms or more, in a terminal position is generally undesirable because they contribute hydrophobic properties, cause association between molecules (and therefore an effect similar to increasing the molecular weight) and make the polymers less suitable for use as, for instance, dispersants.

Within the broad inventive concept defined above there are certain areas of particular value.

As mentioned above certain low molecular weight vinyl acetate copolymers are mentioned in British Specification No. 1414964 for dispersing pigments and as grinding dispersants for pigments. In practice however these have not made any significant commercial impact and the dispersants normally used are the low molecular weight polyacrylic acids having PD generally above 1.8.

According to one aspect of the invention a dispersion in water of a pigment includes, as dispersing agent, a polyacrylic acid having PD below 1.5 and Mw in the range about 1,000 to about 3,300, preferably 1,000 to 3,000 and most preferably in the range about 1,800 to about 2,200, with best results generally being achieved at values of around 2,000. PD preferably is in the range 1.05 to 1.4, most preferably 1.1 to 1.3 or 1.35.

These dispersions can conveniently be made simply by blending particulate pigment with water in the presence of the dispersing agent, the amounts of pigment and dispersing agent being conventional. For instance the amount of dispersing agent is often from 0.05 to 0.3% by weight dry polymer based on dry pigment. The amount of pigment is often from 10 to 90% by weight of the dispersion, most preferably 50 or 60 up to 80% by weight. The pigment will be chosen having regard to the intended use of the dispersion. Often the dispersion is used in the paper industry, for instance for paper coating, and suitable pigments include china clay, talc, titanium dioxide and precipitated calcium carbonate. The particle size is generally in the range 0.5 to 100 microns, preferably 1 to 50 microns.

It is well recognised that there is a particular problem in making concentrated pigment dispersions by grinding calcium carbonate in water, particularly if very fine particle sizes are required. This is discussed in our European Patent Specification No. 108842 and in the literature to which that refers. We describe in that how sodium polyacrylate Mw 2,800 is conventionally used but that improved results can be obtained using acrylic acid-AMPS copolymers, the best result (lowest viscosity) being shown at Mw around 5,700.

According to a second aspect of the invention a dispersion of calcium carbonate in water is made by grinding calcium carbonate in water in the presence of a dispersing agent that is a polyacrylic acid having PD below 1.5 and Mw in the range about 2,500 to about 4,500, most preferably in the range 3,300 to 3,900.

According to a third aspect of the invention a dispersion of calcium carbonate in water is made by grinding calcium carbonate in water in the presence of a dispersing agent that is a copolymer of acrylic acid and AMPS having PD below 1.5 and Mw in the range about 1,500 to about 3,500, most preferably about 2,250 to about 2,750.

The preferred molecular weight for the homopolymer is about 3,600 and the preferred molecular weight for the copolymer is about 2,500. The proportions by weight of acrylic acid to AMPS are preferably 99:1 to 50:50.

When grinding calcium carbonate in accordance with either of these aspects of the invention PD is preferably from 1.05 to 1.4, most preferably 1.1 to 1.3.

The grinding is preferably by sand grinding and the resultant particle size of the calcium carbonate (marble) is preferably mainly below 2 microns. The amount of pigment in the resultant dispersion is preferably above 70% and most preferably is above 75%. For more description of suitable grinding techniques, particle sizes and concentrations reference should be made to European Patent Publication No. 108842 and to the literature referred to therein.

In U.S. Pat. No. 3840487 and in British Patent Specification No. 1505555 various aqueous dispersion paints comprising of pigment and a low molecular weight polymeric dispersing agent are described. For the purposes described in those specifications particular polyacrylic acid-ester copolymers are used but in many other instances polyacrylic acid homopolymer, and in particular Dispex N40 is generally regarded as entirely satisfactory. We now find better results are obtained using the novel polymer defined herein. In particular, according to a fourth aspect of the invention an aqueous dispersion paint comprises a pigment, a binder for the paint and a dispersing agent for the pigment, the dispersing agent being polyacrylic acid having PD below 1.5 and Mw in the range about 1,500 to about 6,000. PD is preferably from 1.05 to 1.4, most preferably 1.1 to 1.3 and the molecular weight is preferably in the range 1,500 to 4,500. The aqueous medium of the paint may be water or a mixture of water with a polar solvent, generally a glycol.

The pigment generally is titanium dioxide, china clay, or calcium carbonate and generally has a particle size of 0.1 to 50 microns, preferably 0.2 to 25 microns. The amount of pigment in the paint may be conventional, typically from 5 to 50% by weight of the paint. The binders and other components in the paint may be conventional, for instance as described in U.S. Pat. No. 3,840,487 and British Pat. No. 1505555.

Aqueous drilling and packer fluids, for instance for use in wells for hydrocarbon extraction, consist of an aqueous phase in which inorganic particulate material is or may be dispersed and that contains dissolved organic additives. The inorganic particulate material, during use, includes drill cuttings and generally it includes a colloidal clay such as bentonite. The organic additives will be selected having regard to the properties required of the drilling or packer fluid and generally fall into three classes. One class are known as thinners, gel preventors or dispersants and these serve to reduce viscosity or prevent undesirable increases in viscosity, for instance by keeping the particulate material in fluid dispersion. Another class are known as fluid loss additives or filtration control agents and have higher molecular weight than the dispersants. A third class are known as viscosifiers, and have even higher molecular weight.

Various low molecular weight polymers containing acid groups have been proposed for use as dispersants in aqueous drilling or packer fluids. For instance in U.S. Pat. No. 3,730,900 styrene sulphonic acid maleic anhydride copolymers of molecular weight from 1,000 to 5,000 are described and have been used extensively under the trade name "Miltemp". In U.S. Pat. No. 3,764,530 and in British Pat. No. 2,120,708 it is proposed to use various low molecular weight acrylic acid polymers. In British Pat. No. 2,090,888 it is proposed to use a copolymer of acrylic acid and hydroxy propyl acrylate. These materials would all have had conventional high or very high polydispersity values.

According to a fifth aspect of the invention a drilling or packer fluid includes, as dispersant, a low molecular weight polymer containing acid groups and having PD below 1.5 and, preferably, the dispersing agent is polyacrylic acid having PD below 1.5 and Mw in the range 1000 to 50,000 and that is such that the polymer is effective as a dispersant or thinner. Mw is generally below 20,000 and preferably below 10,000. Mw 1000 or 1500 to 5000 is generally preferred with best results around 1500 to 4000. The acid groups may all be carboxylic acid groups (e.g. polyacrylic acid) or may include sulphonic acid groups (e.g. acrylic acid—AMPS copolymers).

PD preferably is in the range 1.05 to 1.4, most preferably 1.1 to 1.3 or 1.35. The amount of dispersant is generally 0.5 to 30 g/l, most preferably 0.5 to 3 g/l.

The fluid may contain other thinners, for instance lignosulphonate thinners, but preferably the polyacrylic acid is the only dispersant or thinner. The fluid may contain other fluid loss additives. It generally contains bentonite or other colloidal clay, generally in amounts of from 25 to 150 g/l. The fluid may contain a weighting agent such as barites, typically in amounts of from 100 to 1,000 g/l.

The polymers (and especially those containing AMPS or other sulphonic monomer) are of particular value when the fluid contains dissolved calcium, generally in amounts of at least 0.25 grams dissolved calcium per liter of fluid, typically 0.5 to 10 g/l. For instance the fluid may contain 2 to 30 g/l calcium hydroxide or sulphate or other calcium compound that can contribute dissolved calcium.

It is known to include relatively low molecular weight acidic polymers in detergent compositions in order to sequester, for instance, calcium and to act as what is termed a "detergent builder". We have surprisingly found that the low PD polymers of this invention have improved detergent building properties compared to the corresponding polymers of higher PD and so according to a sixth aspect of the invention detergent compositions contain, as detergent builder water soluble polymer formed from one or more ethylenically or other unsaturated monomers and contains acid groups selected from carboxyl, sulphuric and sulphonic groups, or is a water soluble salt thereof, and has a polydispersity of below 1.5 and has a low molecular weight. Mw is normally at least about 1,000, preferably at least 1500, and can be up to about 50,000 although it is generally up to 20,000 and preferably it is up to about 5,000 or about 6000. Particularly preferred products are those having PD below 1.4 and Mw 1,000 to 4,000.

Generally PD=1.05 to 1.45 and in particular from 1.1 to 1.4. The best results are obtained with PD below 1.4 and preferably below 1.35. Although it is desirable for the value to be as close to 1 as possible it is generally acceptable for it to be above 1.25.

Any of the chemical types of polymers discussed above may be used but preferably the polymer is a carboxylic polymer (e.g. polyacrylic acid) or a copolymer containing carboxylic and sulphonic groups (e.g. an acrylic acid—AMPS copolymer).

The amount of the polymer is the composition may be typical for detergent builders, e.g. 5 to 75% and the compositions may contain conventional detergent components.

Hard surface detergents usually have as their main active ingredients one or more inorganic alkaline compounds. Examples of such compounds are alkali metal hydroxides, silicates, phosphates, polyphosphates, hypochlorite. Alternatively or additionally hard surface detergent compositions may comprise one or more organic surfactants.

Detergent compositions for use in cleaning fabrics have as their main active ingredients organic surfactants.

Organic surfactants that may be used in the detergent compositions of the invention may include anionic, cationic, non-ionic and amphoteric surfactants.

Anionic surfactants may be carbonates (soaps), sulphonates, sulphates or phosphates. Particularly suitable surfactants are alkali metal salts of natural fatty acids, or alkylbenzene sulphonates in which the alkyl radical has from about 8 to about 22 carbon atoms, alkali metal alkyl sulphates in which the alkyl group has from 8 to 18 carbon atoms.

Non-ionic synthetic detergents may be aliphatic or alkyl aromatic for example derived from alkalene oxides and glycols, such as ethylene oxide, propylene glycol and/or propylene oxide and their condensation products. Other suitable non-ionic detergents are fatty acid esters of sugars or tertiary phosphate oxides.

Amphoteric surfactants generally contain a quaternary ammonium ion and a sulphonic acid or carboxylic acid group and are particularly useful in cool water detersive systems.

The detergent compositions may comprise in addition conventional additives which may be organic or inorganic such as anti-redeposition agents, corrosion inhibitors, foaming or anti-foaming agents, bleaching agents, fluorescent whitening agents, antimicrobial agents, proteolitic enzymes and fillers. They may also comprise cobuilders such as conventional detergent builders such as sodium tripolyphosphate or other phosphates. Anti-redeposition agents may be for instance sodium carboxymethyl cellulose or other starch derivatives or hydrophilic synthetic polymers.

The detergent compositions are generally in the form of dry granules but may be liquid compositions, for example solutions or slurries. Dry granular compositions are usually formed by spray drying an aqueous slurry of the components in water.

By using polymers of low polydispersity, which are very effective calcium sequesterants, the use of undesirable phosphate builders can be reduced or eliminated altogether.

The low polydispersity values required in the invention can be obtained by various techniques. For instance, a polymer can be made by a conventional polymerisation technique, for instance, solution polymerisation, to obtain a product having a high polydispersity value (typically 2 or higher) and may then be subjected to careful fractional precipitation so as to obtain fractions each having a polydispersity below 1.5. The conditions for conducting the fractional precipitation must be such as to give this low polydispersity and so must consist of isothermal non solvent addition as detailed in Chapter B1 of "Polymer Fractionation" Ed. Manfred Cantow.

Another way of obtaining the desired polymer is to conduct its synthesis under conditions that lead to its formation. For instance the polymer may be made by solution polymerisation in the presence of isopropanol as chain regulator. The process must be carried out under very uniform and closely monitored conditions, for instance controlled feeds of monomer, and initiator and uniform temperature throughout. If the product that is obtained has a polydispersity above the desired value it must be rejected or treated in such a manner as to reduce its polydispersity.

Another way of obtaining the desired polymer is to make an insoluble acrylate polymer having the desired PD and Mw values, for instance as described in Example 40 of European Patent Specification No. 68887 and then to hydrolyse the acrylate to the free acid, for instance by reaction with sodium hydroxide at 85° C. for 6 hours or as long as is necessary to achieve hydrolysis, the reaction generally being conducted in the presence of methanol as a diluent.

In a preferred method a solution is formed of a water soluble polymer containing acid groups in a blend of a polar solvent, water and base in an amount sufficient to neutralise at least 10% but not more than 90% molar of the said acid groups and the solvent, the base and the amount of base and/or the amount of solvent are selected to cause phase separation of the solution into an aqueous phase containing a higher molecular weight fraction and an organic phase containing a lower molecular weight fraction and subsequently both these fractions are used.

The precise split between the lower and higher molecular weight fractions can be selected by altering the process conditions, and in particular the degree of neutralisation, and so the method provides, for the first time, a simple process by which an acidic, water soluble, polymer can be fractionated into preselected molecular weight fractions. Unlike prior processes where the organic fraction is usually rejected, in the invention both fractions of polymer are commercially useful and so are recovered and used, the fraction in the organic phase being useful where lower molecular weights are desired and the fraction in the aqueous phase being useful where higher molecular weights are desired.

Additionally we have surprisingly found that the polymers in each fraction generally has at least one activity that is very much improved compared to the activity of the starting polymer. Often the polymer of one fraction has one type of greatly improved activity (for instance as a viscosifier) while the polymer in the other fraction may have a different type of greatly improved activity (for instance as a dispersant).

The polymer in each fraction will have lower polydispersity (weight average molecular weight divided by number average molecular weight) than the starting polymer. For instance the initial value is almost always above 1.6, and often is above 2, but the fractions obtained in the invention have values of below 1.5, often 1.05 to 1.45 and most preferably 1.1 to 1.4.

Each of the polymer solutions can be used in the form in which it is obtained by phase separation, for instance simply by mixing the solution into the water or other liquor to be treated, or the polymer can be recovered from the solution by evaporation, precipitation or other conventional recovery techniques. The polymer in each of the separated solutions is generally in a partially neutralised state and can be acidified or fully neutralised in conventional manner if desired.

The process conditions that can be altered to affect the split between lower and higher molecular weight fractions include the choice of solvent, the choice of base, the amount of solvent and the amount of base. Once one has appreciated the novel concept that it is possible to fractionate usefully provided the acidic groups are partially neutralised, as opposed to full neutralisation in the prior art, it is possible to obtain any particular desired split or fractionation by appropriate selection of solvent, base, and amounts of each.

The particular solvent may have to be selected having regard to the nature of the polymer, and in particular its molecular weight. For instance the polar solvents are generally selected from $C_{1-5}$ alcohols and $C_{3-8}$ (generally $C_3$ or $C_4$) aliphatic ketones, most preferably isopropanol or acetone. Although the alcohols are very suitable for a wide range of polymers they are of particular value for the lower molecular weight polymers, molecular weight preferably below 100,000 most preferably below 30,000 and, especially, below 10,000. In contrast, the ketones are primarily of value for fractionating higher molecular weight polymers, for instance having average molecular weight above 50,000, generally above 100,000 and preferably above 200,000 or even 500,000.

In one preferred process of the invention a solution is formed in a blend of water and a polar solvent of a water soluble polymer containing neutralised acid groups and the solution is separated into an aqueous phase containing a higher molecular weight fraction of the polymer and an organic phase containing a lower molecular weight fraction of the polymer, and in this process the polar solvent is a $C_1$ to $C_5$ alcohol, the acid groups are neutralised with cations selected from sodium, potassium, lithium and ammonium and the molar proportion of neutralised acid groups is 10 to 55% when the cation is selected from sodium and potassium, 10 to 70% when the cation is ammonium and 30 to 90% when the cation is lithium.

The polymer may have been made by any conventional polymerisation process and may have then been isolated, for instance as a solid, from any liquid phase in which it was formed, and then redissolved in the aqueous organic solution containing base used in the invention. Generally however the process of the invention is conducted on a solution of the polymer obtained by solution polymerisation of the appropriate monomers. The preferred solution polymerisation medium is an aqueous solution containing appropriate initiators or other polymerisation promotors, for instance water soluble peroxides and persulphates, or redox catalysts or catalysts for photopolymerisation and will generally include an organic solvent, for instance as a molecular weight regulator. Other known molecular weight regulators (e.g. that provide terminal —COOH, —OH or $C_{1-3}$ alkyl groups) may be included in the solution if desired.

The solution polymerisation may be conducted in the presence of the amounts of solvent, base and water required for the fractionation provided the polymerisation is conducted with sufficient agitation to prevent separation during polymerisation, the polymerisation mixture then being allowed to stand to allow separation to occur. Generally however the polymerisation is conducted in the presence of amounts of solvent, base and water such that separation will not occur and these amounts are then adjusted after polymerisation to cause separation.

In one process the solution of polymer is made by polymerisation in a mixture of water and organic solvent and this organic solvent may serve as the organic liquid for use in the invention. Generally this solvent should be fully miscible with the aqueous polymer solution, e.g. an alcohol or acetone. A very common solvent in solution polymerisations is isopropanol and blends of water and isopropanol are often very suitable in the invention. When polymerisation is conducted in the presence of the chosen solvent fractionation can then be brought about by appropriate adjustment of the amount of cation in the solution. With many monomers the polymerisation is generally conducted on the free acid form of the monomers in which event the base adjustment is effected by adding the appropriate amount of alkali or other source of cation. If the polymerisation is carried out on a wholly neutralised form of monomer (e.g. in the polymerisation of sodium vinyl sulphate) then the cation adjustment can be brought about by adding sufficient free acid to partially acidify the neutralised groups, thereby forming a polymer having the desired degree of neutralised groups. The free acid must be sufficiently strong to acidify the neutralised polymer acid groups. Often it is a mineral acid such as hydrochloric of sulphuric acid. The free acid may be the free acid form of the acidic polymer or it may be a water insoluble acidic polymer, preferably an anionic (generally sulphonic or other strong acid) ion exchange resin.

In another process the polymerisation is conducted in the presence of base in an amount sufficient to neutralise 10 to 90% of the acid groups and then the phase separation is caused by adding the polar solvent in the required amount. If the amount of cation in the polymerisation mixture is not the optimum for the phase separation then additional base (or acid) may be added with the polar solvent to achieve the desired degree of neutralisation.

Irrespective of whether the solution is made by blending preformed polymer, water, organic solvent and base or by adding base to the reaction product of polymerisation in aqueous organic liquid, or in any other manner, the process of the invention requires that phase separation should be brought about between aqueous and organic phase in the presence of the specified solvents and the required amounts of the cations.

The bases are preferably basic compounds of monovalent cations such as sodium, potassium, lithium and ammonium, preferably in the amounts quoted above since in general we find that with most solvents amounts outside these ranges give less satisfactory fractionation. Lower alkyl amines (e.g. ethylamine) may be suitable for some polymers, as may basic compounds of multivalent cations (provided the amount and type of cations does not result in precipitation of the polymer). Suitable multivalent cations include Ca, Zn, Cu, Mg and Al. The basic compounds may be, for example, oxides, hydroxides, carbonates, bicarbonates, alkoxides, phosphates, hydrogen phosphates, phosphonates, polyphosphates or organic carboxylic salts where the organic acid is weaker than the polymeric acid, e.g. sodium acetate, adipate or citrate when the polymeric acid is a sulphuric or sulphonic acid.

The degree of neutralisation of the acid groups controls the fractionation. The results obtained in any particular process will depend upon, inter alia, the concentrations, the polymer type and the solvent but there is a minimum degree of neutralisation below which substantially no fractionation occurs and the system may instead remain as a homogeneous solution. When the cation of the base is sodium, potassium or lithium the degree of neutralisation will normally be at least 10%, often at least 15% and preferably at least 25% whilst if the cation is lithium the degree of neutralisation will normally have to be at least about 30%, preferably at least 40% and generally at least 50%. If the degree of neutralisation is too high the size of the lower molecular weight fraction is unacceptably low. When the cation of the base is sodium or potassium the degree of neutralisation will normally be below 55%, preferably below 50% and most preferably below 40%. When the cation of the base is ammonium the degree of neutralisation will normally be below 70%, preferably below 60% and most preferably below 50%. When the cation of the base is lithium the degree of neutralisation will normally be below 90%, and preferably below 70%.

In any particular process the size of, for instance, the higher molecular weight fraction can be increased (with consequential reduction in its average molecular weight and consequential reduction in the size and the average molecular weight of the lower molecular weight fraction) by increasing the amount of base and conversely the size of the low molecular weight fraction can be increased by reducing the amount of base.

The process conditions are usually selected such that each fraction contains from about 10 to 90%, preferably about 20 to 80%, and most preferably 30 to 70%, by weight of the starting polymer.

The partial neutralisation of the acidic polymer is normally achieved by adding a hydroxide or other base that will provide the chosen cation in the selected amount to the dissolved polymer. Mixtures of two or more cations may be utilised, in which event the proportions will be selected such that they have the same effect as suitable amounts of the individual cations.

For any particular polymer, the degree of fractionation is dependent not only on the degree of neutralisation and the type of cation but also upon the concentration of the polymer and the choice and amount of the alcohol or other solvent. The alcohol is preferably isopropanol but propanol and other alcohols, especially $C_2$ to $C_5$ alcohols, may be used. The proportion water:alcohol or other solvent by weight is preferably from 1:0.2 to 1:5, most preferably 1:0.5 to 1:2 with best results generally being achieved, especially when the solvent is isopropanol and the cation is sodium, when the proportion is about 1:1. The proportions should be selected such that, having regard to the degree and nature of neutralisation, each of the phases will have a polymer concentration of at least 5%, generally at least 10% and preferably at least 15% by weight of the phase.

The amount of the polymer (measured as the acid polymer) is normally at least 5% by weight based on the weight of polymer, solvent and water (including water introduced with the alkali) and preferably is at least 10%. The concentration must not be so high that the system is so viscous that mixing and phase separation is significantly impeded and so is generally below 30%. Preferably the concentration is 15 to 25% by weight.

The phase separation may also be affected by the temperature at which the process is conducted. This may be between 15° and 80° C. but preferably is between 30° and 70° C.

The process may be conducted by combining the essential components of the solution in any convenient manner, for instance by adding aqueous alkali to the aqueous organic reaction product obtained by polymerisation of the monomer or monomers in aqueous organic solution. The process may be conducted continuously or batchwise. Depending upon the degree of neutralisation, and type and strength of base, the concentration of the polymer, the amount of solvent and the temperature the phase separation may occur rapidly or slowly. For instance it may occur substantially instantaneously or it may be necessary to leave the system to stand for periods of, for instance, 5 minutes to 2 hours, typically 30 minutes to 1 hour. The separation may be conducted batchwise or continuously, with the mix being fed through a conventional separation column or separation reactor.

The two phases are kept separate, may be fully neutralised with the same or different alkali and organic solvent may be stripped from the organic phase by distillation.

Each of the polymer fractions is recovered for subsequent commercial use.

Very low molecular weight fractions obtained by this technique have a particular value as agents for inhibiting and build-up of scale, and settlement of scale, and in particular as antiscalants. For instance we have established that the maximum level of alkalinity that can be maintained in solution is increased if PD is reduced. Thus best results are achieved if Mw is from 350 to 1,000 and PD is below 1.5, most preferably 1.05 to 1.3.

In the following examples, Example 1 demonstrates how a polymer may be made to the desired PD and Mw values by careful polymerisation, and Examples 2 and 3 demonstrate how the polymer may be obtained by partial neutralisation and fractionation.

EXAMPLE 1

To a 700 cm$^3$ resin pot equipped with thermometer, stirrer and external heating, three separate mixtures were continuously added over a 6 hour period.

Feed 1 consisted of: 340 g glacial acrylic acid in 226 g water.

Feed 2 consisted of: 10.5 g 100 vol. hydrogen peroxide and 57.1 g water.

Feed 3 consisted of: 28 g thioglycollic acid and 38.6 g water.

The pot contents were maintained at reflux temperature throughout the addition and then for a further hour before being cooled. The percentage unpolymerised acrylic acid was determined by Gas Liquid Chromatrography and shown to be 0.3% of the amount added. The remaining polymer was fully neutralised by the addition of 46.6% sodium hydroxide and the final product diluted to give a 40% w/w sodium polyacrylate solution.

The viscosity of the product at 25% was 12.1 cS (suspended level viscometer, No. 2, 25° C.). GPC analysis showed Mw=1740, Mn=1321, Polydispersity=1.32.

EXAMPLE 2

A 23% by weight solution of polyacrylic acid in a blend of equal parts by weight isopropanol and water was prepared by polymerisation of acrylic acid using ammonium persulphate as initiator, in conventional manner. Samples of the product were extracted while other samples were neutralised by the addition of varying amounts of sodium hydroxide, introduced as a 46% by weight aqueous solution. Each of the samples, after the addition of sodium hydroxide, was allowed to stand for sufficient time for an aqueous phase to separate from an organic phase (that probably contained some water) and these phases were then separated from one another in conventional manner. Each phase was then fully neutralised with sodium hydroxide and the residual alcohol was removed by distillation. The yield of polymer in each of the phases was recorded.

EXAMPLE 3

A 20% solution of polyacrylic acid having Mw of 3131 and PD (polydispersity) of 1.677 was dissolved in 50/50 w/w isopropanol/water was neutralised with various basic compounds and the two layers separated. The amount and molecular weight of the polymer in each layer was determined. The results are shown in Table 1.

TABLE 1

| Base | % Neutralisation | Aqueous layer | | | Organic layer | | |
|---|---|---|---|---|---|---|---|
| | | % Extracted | Mw | P.D. | % Extracted | Mw | P.D. |
| NaOH | 25 | 75.2 | 3833 | 1.30 | 24.8 | 1452 | 1.402 |
| NH4OH | 25 | 55.6 | 4025 | 1.30 | 44.4 | 1689 | 1.34 |
| LiOH | 25 | NO SEPARATION | | | | | |
| LiOH | 50 | 50.2 | 3957 | 1.427 | 49.8 | 1783 | 1.44 |
| KOH | 25 | 63.5 | 3649 | 1.56 | 36.5 | 1402 | 1.49 |
| NaOH | 15 | 20.6 | 3976 | 1.49 | 79.4 | 2027 | 1.63 |
| NaOH | 50 | 95.7 | 3688 | 1.51 | 4.3 | Very low | |
| NaOH | 75 | 99.3 | 3376 | 1.53 | 0.7 | Very low | |

EXAMPLE 4

The product obtained in Example 2 were adjusted to 40% active solids and compared as marble grinding aids as described in Example 11 of British Patent Specification No. 1,414,964. The results are set out in Table 2.

TABLE 2

| Percent Neutralisation | Yield Percent | | Aqueous Layer Milling index |
|---|---|---|---|
| | Organic | Aqueous | |
| 10 | 87.2 | 12.8 | — |
| 15 | 79.3 | 20.7 | — |
| 25 | 23.1 | 76.9 | 1.94 |
| 50 | 4.0 | 96.0 | 2.33 |
| 75 | 0.7 | 99.3 | 1.22 |
| 100 | 0.5 | 99.5 | 0.37 |

In the described test a milling index value of around 0.5 is generally satisfactory as it indicates commercially acceptable properties for preventing gelation of the marble dispersion.

It is apparent from the table that after full neutralisation almost all the polymer is in the aqueous phase but that substantial amounts of polymer go into the organic phase at low degrees of neutralisation. It is also very notable that the milling index is greatly improved even when the amount of polymer that is in the organic phase, instead of the aqueous phase, is quite low. For instance at 50% neutralisation the amount of polymer in the organic phase is low but the milling index is about 5 times what would be considered to be commercially adequate. At higher degress of neutralisation only a very low amount of polymer goes into the organic phase.

EXAMPLE 5

A polymer was prepared by conventional polymerisation technique as a 23% solution of acrylic acid in equal amounts of isopropanol and water was neutralised to 25% with aqueous sodium hydroxide after polymerisation. This caused the reaction mixture to separate into two phases. These were separated and the polymer present in such phase was recovered after removal of the isopropanol by distillation. The samples were fully neutralised with sodium hydroxide solution and adjusted to 40% active as sodium polyacrylate.

An unfractionated control polymer was also prepared from the original unneutralised polymer in isopropanol/water by removing the isopropanol by distillation and fully neutralising with sodium hydroxide and adjusting to 40% active as sodium polyacrylate.

The products were evaluated as dispersants for titanium dioxide, having particle size 97% below 2 μm, at 75% w/w slurry solids content by recording the slurry viscosity (cP) at 0.6, 0.8 and 1% dry polymer based on dry pigment. The results are given in Table 3.

TABLE 3

| Neutralisation % | | Mw | Mn | PD | Slurry Viscosity (cP) | | |
|---|---|---|---|---|---|---|---|
| | | | | | 0.6 | 0.8 | 1.0 |
| 100 | Control | 3161 | 2019 | 1.565 | — | 1320 | 1380 |
| 25 | Aqueous phase | 4236 | 2795 | 1.515 | — | — | 2600 |
| 25 | Organic phase | 1795 | 1367 | 1.314 | 3500 | 700 | 340 |

EXAMPLE 6

Samples of narrow polydispersity sodium polyacrylates of decreasing molecular weight were evaluated as dispersant for china clay at 64% w/w slurry solids content at pH 6.8–7.0 and at various dosages, as in Example 4. The results are given in Table 4.

TABLE 4

| Mw | Mn | PD | Slurry Viscosity (cP) | | | | | | |
|---|---|---|---|---|---|---|---|---|---|
| | | | 0.10 | 0.12 | 0.14 | 0.16 | 0.18 | 0.20 | 0.22 |
| 5543 | 4817 | 1.15 | — | — | 1567 | 359 | 290 | 321 | 376 |
| 4876 | 3907 | 1.25 | — | 1483 | 643 | 285 | 296 | 330 | 405 |
| 4447 | 3592 | 1.24 | — | 933 | 423 | 255 | 269 | 312 | 361 |
| 4053 | 3273 | 1.24 | — | 703 | 263 | 225 | 249 | 284 | — |
| 3202 | 2709 | 1.18 | — | 234 | 198 | 211 | 233 | 271 | — |
| 2144 | 1901 | 1.13 | 533 | 183 | 190 | 207 | 231 | 266 | — |
| 1065 | 834 | 1.28 | 637 | 226 | 198 | 201 | 213 | 230 | — |

The results show that the most effective sodium polyacrylates for china clay dispersants lie between a molecular weight of 1000–3000. Preference been given to a molecular weight of approximately 2000.

EXAMPLE 7

The samples of sodium polyacrylate of similar molecular weight but varying polydispersity were evaluated as marble milling aids. The results are expressed as Milling Index using a test method as described in Example 11, British Pat. No. 1,414,964 are shown in Table 5.

TABLE 5

| Mw | PD | Milling Index |
|---|---|---|
| 3225 | 1.38 | 2.54 |
| 3105 | 1.52 | 1.23 |
| 3229 | 1.63 | 0.29 |
| 3358 | 2.01 | <0.20 |

The results show that the effectiveness of sodium polyacrylate on marble milling is dependent on polydispersity. The lower the polydispersity the more effective the product.

EXAMPLE 8

It can be shown that the interrelationship between molecular weight and polydispersity of a sodium AMPS/sodium acrylate (20/80 w/w) copolymer has a crucial effect when the product is evaluated as a marble grinding aid according to Example 11 of British Patent Specification No. 1,414,964. The interrelationship between these parameters is shown in Table 6.

TABLE 6

|  | Mw | PD | Milling Index |
|---|---|---|---|
| Low molecular weight low polydispersity | 2351 | 1.26 | 2.6 |
|  | 2630 | 1.34 | 2.4 |
| Low molecular weight high polydispersity | 2834 | 1.6 | 0.38 |
|  | 3151 | 1.55 | 0.44 |
| High molecular weight low polydispersity | 7193 | 1.40 | 0.67 |
|  | 4625 | 1.47 | 0.81 |
| High molecular weight high polydispersity | 6265 | 1.64 | 0.64 |
|  | 5836 | 1.53 | 0.77 |

The results show that polymers of low molecular weight with narrow polydispersity are the most effective marble grinding aids. The optimum molecular weight lies between 1500 and 3500 with preference given to polymers with a molecular weight of 2500.

EXAMPLE 9

Samples of sodium polyacrylate of similar molecular weight but varying polydispersity were evaluated as in Example 4 as dispersants for precipitated calcium carbonate at 70% w/w slurry solids content. The results are given in Table 7.

TABLE 7

| Mw | PD | Brookfield Viscosity | | | | | | |
|---|---|---|---|---|---|---|---|---|
|  |  | 0.150 | 0.175 | 0.200 | 0.225 | 0.250 | 0.275 | 0.300 |
| 3226 | 1.38 | 117 | 114 | 130 | 177 | 114 | 107 | 104 |
| 3105 | 1.52 | 120 | 134 | 167 | 178 | 164 | 130 | 127 |

The results show the partition of the polymer and the average molecular weight is independent of temperature. However, the speed of phase disengagement increased with temperature.

EXAMPLE 10

Other polymers are prepared by the general technique described in Example 1 but using different monomers. When the monomer consisted solely of methacrylic acid 25% neutralisation with sodium hydroxide fractionated the product into a lower molecular weight isopropanol phase that was useful as a dispersant for china clay and a higher molecular weight aqueous phase.

When the monomer consist of equal parts by weight itaconic acid and methacrylic acid 25% neutralisation with sodium hydroxide results in fractionation into a higher molecular weight aqueous phase and a lower molecular weight isopropanol phase.

When the monomer consisted of sodium vinyl sulphonate the initial polymer is in the sodium form and this can be part neutralised by acidic ion exchange resin and then fractionated using isopropanol.

EXAMPLE 11

To compare the effect of PD on the polymers when used as detergent builders in conventional detergent compositions the calcium tolerance of the polymers was determined in a Hampshire Test using a calcium ion selective electrode. In this test the highest possible value is required. When the polymer was polyacrylic acid Mw about 3000 PD about 1.6 the value (in Moles $Ca^{2+}$ required per mole of polymer) was 0.625 but when the polymer was polyacrylic acid of similar molecular weight but PD 1.18 the value was 0.780.

EXAMPLE 12

Drilling muds were formulated of 25 ppb bentonite, 220 ppb barites, 4 ppb gypsum, 2 ppb $Ca(OH)_2$ and the viscosity of the mud after addition of various amounts of polymers was determined. When the polymer was polyacrylic acid Mw about 3000 and PD about 1.6 the minimum viscosity was obtained at a dose of about 1.2 ppb. When the polyacrylic acid was fractionated into fractions each having PD in the range 1.1–1.4, both fractions gave a lower viscosity at a lower dosage, the higher molecular weight fraction giving a low viscosity over a wide range of dosages while the lower molecular weight fraction gives the lowest viscosity.

We claim:

1. A water soluble polymer formed from one or more unsaturated monomers and containing acid groups selected from carboxylic, sulphuric and sulphonic acid groups, or a water soluble salt thereof, and which has PD below 1.4 and Mw, measured on the full sodium salt, of from 1,000 to 50,000.

2. A water soluble polymer formed from one or more unsaturated monomers and containing acid groups selected from carboxylic, sulphuric and sulphonic acid groups, or a water soluble salt thereof, and which is terminated by groups selected from OH, COOH and $C_{1-3}$ alkyl and which has PD below 1.5 and Mw, measured on the full sodium salt, of from 1,000 to 50,000.

3. Polymers according to claim 2 selected from polyacrylic acid and copolymers of acrylic acid with 2-acrylamido-2-methyl propane sulphonic acid and which are terminated by groups selected from OH, COOH and $C_{1-3}$ alkyl and which have PD below 1.4 and Mw, measured on the full sodium salt, of from 1,000 to 5,000.

4. A dispersion of particulate material in an aqueous medium containing a dispersing agent for the particulate material and in which the dispersing agent is a water soluble polymer formed from one or more unsaturated monomers and containing acid groups selected from carboxyl and sulphonic groups, or a water soluble salt thereof, characterised in that the polymer has PD below 1.5 and Mw (measured as the sodium salt) of from about 1,000 to about 50,000.

5. A dispersion according to claim 4 in which PD is 1.05 to 1.4 and Mw is below 6,000.

6. A dispersion according to claim 4 in which the unsaturated monomers are selected from methacrylic acid, itaconic acid, vinyl sulphonic acid, vinyl sulphuric acid, allyl sulphonic acid, maleic acid, fumaric acid, acrylic acid, 2-acrylamido-2-methyl propane sulphonic acid and 2-acrylamide-2-phenyl propane sulphonic acid.

7. A dispersion of pigment in water containing a water soluble dispersing agent that is polyacrylic acid, or a water soluble salt thereof, having PD below 1.5 and Mw, measured on the full sodium salt, in the range about 1,000 to about 3,000.

8. A dispersion in water made by grinding calcium carbonate in water containing a water soluble dispersing agent that is polyacrylic acid, or a water soluble salt thereof, having PD below 1.5 and Mw in the range about 2,500 to about 4,500.

9. A dispersion in water made by grinding calcium carbonate in water containing a water soluble dispersing agent that is a copolymer of acrylic acid and 2-acrylamido-2-methyl propane sulphonic acid or a salt thereof, having PD below 1.5 and Mw, measured on the full sodium salt, in the range about 1,500 to about 3,500.

10. An aqueous dispersion paint comprising a pigment, a binder for the paint and a water soluble dispersing agent for the pigment that is polyacrylic acid or a salt thereof having PD below 1.5 and Mw, measured on the full sodium salt, in the range about 1,500 to about 5,000.

11. A detergent composition containing, as detergent builder, a water soluble polymer formed from one or more unsaturated monomers and containing acid groups selected from carboxyl and sulphonic groups, or a water soluble salt thereof, and which has PD below 1.5 and Mw (measured as the sodium salt) of from about 1,000 to about 50,000.

12. A composition according to claim 11 in which the polymer is selected from polyacrylic acid and copolymers of acrylic acid and 2-acrylamido-2-methyl propane sulphonic acid.

* * * * *